US007142880B2

(12) United States Patent
Schmandt et al.

(10) Patent No.: US 7,142,880 B2
(45) Date of Patent: Nov. 28, 2006

(54) METHOD OF INCREASING THE DATA THROUGHPUT IN A COMMUNICATION SYSTEM

(75) Inventors: Bernd Schmandt, Wuppertal (DE); Michael Warmers, Erkelenz (DE)

(73) Assignee: Infineon Technologies AG, Munich (DE)

( * ) Notice: Subject to any disclaimer, the term of this patent is extended or adjusted under 35 U.S.C. 154(b) by 505 days.

(21) Appl. No.: 10/348,452

(22) Filed: Jan. 21, 2003

(65) Prior Publication Data

US 2003/0143953 A1    Jul. 31, 2003

Related U.S. Application Data

(63) Continuation of application No. PCT/DE01/02542, filed on Jul. 5, 2001.

(30) Foreign Application Priority Data

Jul. 19, 2000    (DE) ................. 100 35 132

(51) Int. Cl.
 *H04Q 7/20* (2006.01)
(52) U.S. Cl. .............. 455/515; 370/442; 455/500
(58) Field of Classification Search ........ 455/450, 455/455, 500, 507, 509, 515, 516, 517; 370/912, 370/913, 321, 347, 442
See application file for complete search history.

(56) References Cited

U.S. PATENT DOCUMENTS

| 5,247,617 | A | * | 9/1993 | Olson ................. 710/46 |
| 5,875,387 | A | * | 2/1999 | Ayerst ............... 340/7.42 |
| 5,923,648 | A | * | 7/1999 | Dutta ................ 370/280 |
| 6,018,661 | A | * | 1/2000 | Raith et al. .......... 455/437 |
| 6,366,761 | B1 | * | 4/2002 | Montpetit ........... 455/12.1 |
| 6,775,258 | B1 | * | 8/2004 | van Valkenburg et al. .. 370/338 |
| 6,804,209 | B1 | * | 10/2004 | Sugaya et al. ........ 370/328 |
| 6,907,247 | B1 | * | 6/2005 | Thompson et al. ..... 455/450 |
| 6,965,590 | B1 | * | 11/2005 | Schmidl et al. ....... 370/343 |
| 6,970,448 | B1 | * | 11/2005 | Sparrell et al. ....... 370/347 |
| 6,982,969 | B1 | * | 1/2006 | Carneal et al. ....... 370/329 |
| 2002/0034961 | A1 | * | 3/2002 | Dorenbosch et al. ... 455/518 |

FOREIGN PATENT DOCUMENTS

JP   62-80445      5/1987
WO   WO 00/31932   6/2000

OTHER PUBLICATIONS

Author not listed, "Specification of the Bluetooth System", Core, Bluetooth, Dec. 1, 1999, Document No. 1.C.47./1.0 B, pp. 99-125, pp. 1001-1008.
Author not listed, "Siemens Transdata—Datanübertragungsprozeduren", [Siemens Transdata—Data Transmission Procedures], Siemens, Apr. 1971, pp. 1-21.

(Continued)

*Primary Examiner*—Quochien B. Vuong
*Assistant Examiner*—Christian A. Hannon
(74) *Attorney, Agent, or Firm*—Laurence A. Greenberg; Werner H. Stemer; Ralph E. Locher

(57) ABSTRACT

Data throughput is increased in a communication system that is designed for a bidirectional information exchange between a single master terminal unit and a number of slave terminal units. For that purpose, unoccupied transmission resources of the communication channel are used, and additional addressing times are entered in a predetermined addressing schedule in which the addressing times are entered at which the master terminal unit prompts the slave terminal units for data output. The method is specifically suited for the Bluetooth standard.

20 Claims, 3 Drawing Sheets

OTHER PUBLICATIONS

Haartsen, J.: "Bluetooth—The Universal Radio Interface for ad hoc, Wireless Connectivity", Ericsson Review, Stockholm, SE, No. 3, 1998, pp. 110-117.

Kalia, M. et al.: "Data Scheduling and SAR for Bluetooth MAC", IEEE, US, vol. 2 of 3, Conf. 51, May 15, 2000, pp. 716-720.

* cited by examiner

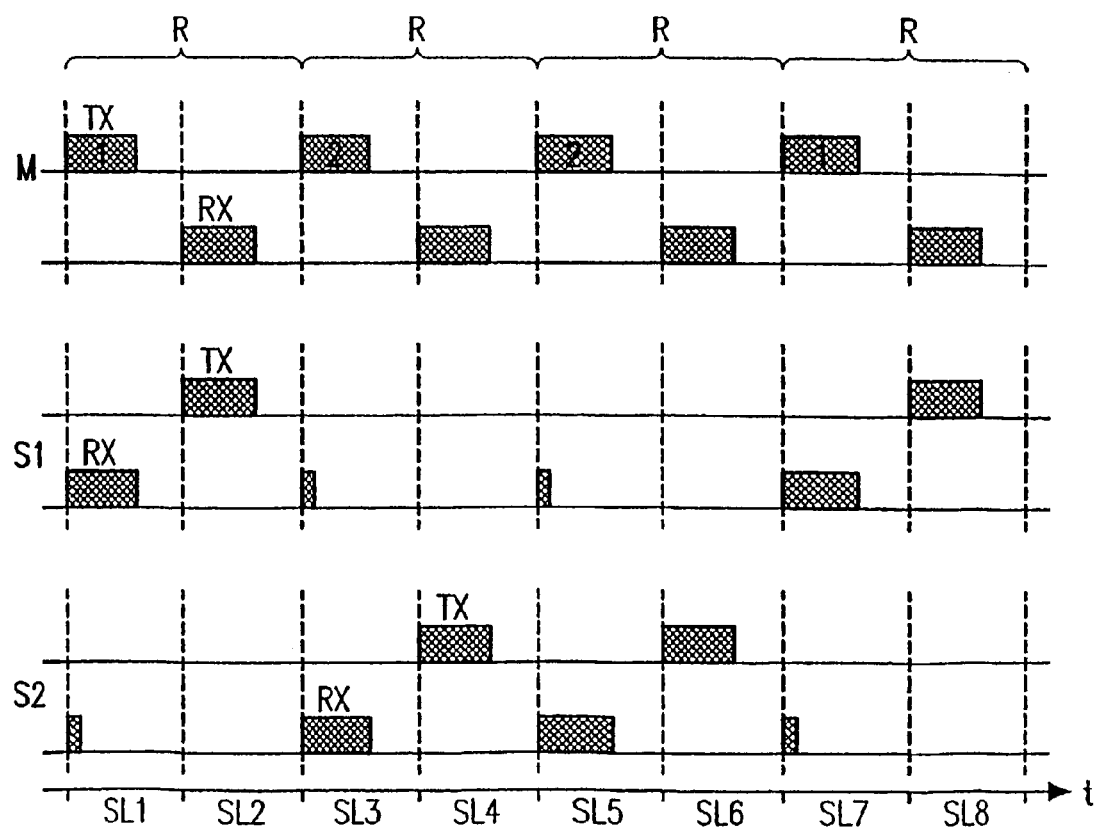

Fig.7
(PRIOR ART)

| Rows Carried Forward | 0 | 1 | 2 | 3 | 4 | 5 | 6 | 7 | 8 | 9 |
|---|---|---|---|---|---|---|---|---|---|---|
|  | B | C | D | E |  |  |  |  |  |  |
| +10 |  |  |  |  |  |  |  |  |  |  |
| +20 | B | C! | D | E |  |  |  |  |  |  |
| +30 |  |  |  |  |  |  |  |  |  |  |
| +40 | B | C! | D | E |  |  |  |  |  |  |
| +50 |  |  |  |  |  |  |  |  |  |  |
| +60 | B | C! | D | E |  |  |  |  |  |  |
| +70 |  |  |  |  |  |  |  |  |  |  |
| +80 | B | C! | D | E |  |  |  |  |  |  |

Column Number (for above)

Fig.8

| Rows Carried Forward | 0 | 1 | 2 | 3 | 4 | 5 | 6 | 7 | 8 | 9 |
|---|---|---|---|---|---|---|---|---|---|---|
|  | B | C | D | E |  |  |  |  |  |  |
| +10 |  |  |  |  |  |  |  |  |  |  |
| +20 | B | C! | D | E | C! | C! | C! | C! | C! | C! |
| +30 | C! | C! | C! | C! | C! | C! | C! | C! | C! | C! |
| +40 | B | C! | D | E | C! | C! | C! | C! | C! | C! |
| +50 | C! | C! | C! | C! | C! | C! | C! | C! | C! | C! |
| +60 | B | C! | D | E | C! | C! | C! | C! | C! | C! |
| +70 | C! | C! | C! | C! | C! | C! | C! | C! | C! | C! |
| +80 | B | C! | D | E | C! | C! | C! | C! | C! | C! |

METHOD OF INCREASING THE DATA THROUGHPUT IN A COMMUNICATION SYSTEM

CROSS-REFERENCE TO RELATED APPLICATION

This application is a continuation of copending International Application No. PCT/DE01/02542, filed Jul. 5, 2001, which designated the United States and which was not published in English.

BACKGROUND OF THE INVENTION

FIELD OF THE INVENTIOIN

The invention lies in the communications technology field. More specifically, the invention relates to a method for increasing the data throughput in a communications system, particularly in the Bluetooth communication system, which is designed for a bi-directional information exchange between a single master terminal unit and a number of slave terminal units on the basis of data packets. A communication channel of the system has a predetermined timeslot structure where, in each timeslot, either information from the master terminal unit can be transmitted to one or more of the slave terminal units or information can be transmitted from a slave terminal unit to the master terminal unit. Further, at least in a first type of link, the master terminal unit addresses each slave terminal unit, to which an already existing connection is set up, by repeatedly sending to it a data packet, addressed to the corresponding slave terminal unit, in accordance with a suitable addressing schedule, and the slave terminal unit can only send back a limited number of data packets carrying useful information to the master terminal unit if it has first been addressed by the master terminal unit by receiving a data packet.

A communication system of that type is described in the file "Specification of the Bluetooth System", Dec. 1, 1999, Document No. 1.C.47./1.0 B, published on the Internet under the address http://www.bluetooth.com. The system is based on a recently developed communications standard which provides for a TDD (Time Division Duplex)-based data transmission between electronic terminal units (e.g. computers, computer peripherals, telephones, branch exchanges). Bluetooth is a wireless standard and specification wherein the data are transmitted via a radio link.

A special feature of the Bluetooth system consists in that not all terminals communicating with one another have equal access authorization. The Bluetooth system comprises exactly one master terminal unit and one or more slave terminal units. The role (slave or master) assumed by a terminal unit in the communication system is not a characteristic of the corresponding terminal unit but can be freely assigned at the protocol level of the system. The master terminal unit acts as controlling entity for the slave terminal units.

The Bluetooth communication channel is subdivided into timeslots with a length of 625 µs. In each timeslot, only data of one transmitter (either master terminal unit or one of the slave terminal units) can be transmitted. It is to be noted that a slave terminal unit in the active state (i.e. when the connection set-up to the master terminal unit has already been concluded) can only transmit useful data in the form of data packets to the master terminal unit if it has first received a data packet (either a data packet carrying useful data or a data packet especially provided for the data retrieval).

A further special feature of the Bluetooth communication system consists in that two types of connection, namely a synchronous data connection (for voice) and an asynchronous data connection (for pure data applications) are supported. A synchronous data connection is called an SCO (Synchronous Connection-Oriented) connection and an asynchronous data connection is called an ACL (Asynchronous Connection-Less) connection. In an ACL connection, the volume of data which can be sent back by a slave terminal unit in response to a data packet received from the master terminal unit is limited (put more precisely, a slave terminal unit can only send out a single data packet following each data packet received in the case of an ACL connection). This restriction makes it necessary for the master terminal unit to regularly address all slave terminal units by sending them a data packet in order to reliably guarantee a minimum data transfer rate in the uplink (i.e. from the slave terminal units to the master terminal unit). If the useful data traffic in the downlink (from the master terminal unit to a slave terminal unit considered) is not sufficient for this, special poll data packets are used, as mentioned above.

The data packet traffic in the downlink, therefore, takes place in accordance with an addressing schedule which, on the one hand, ensures that the data volume at the master terminal unit is distributed to the active slave terminal units intended as addressees and which, on the other hand, guarantees that active slave terminal units for which no useful data are presently available in the master terminal unit are still addressed or polled at a minimum polling rate.

A known possibility which meets the above-mentioned requirements consists in addressing the slave terminal units periodically offset in time by using repetition time intervals which are in each case constant. The repetition time interval must be short enough to guarantee the required minimum data transfer rate.

This rigid addressing schedule has the advantage of a fixed correlation between timeslots and slave terminals and, therefore, requires little controlling effort. However, it does not provide for optimum data throughput in the system. The reason for this is that, apart from the capacity which is needed for the communication among active terminal units, a remaining capacity must be available, if required, for further tasks such as setting up connections, clearing down connections, signaling of branch exchanges which are in a low-energy mode (hold mode, parked mode or sniffing mode). In the case of the rigid addressing schedule, a fixed capacity contingent (i.e. a fixed number of time-slots per repetition interval) must be reserved for this purpose which is not used at all in many situations, as can easily be imagined. For example, the Bluetooth system can be configured in such a manner that the setting up of further connections or certain operating modes is not desired. In consequence, there are in many cases in practice unoccupied capacities which are used neither for the transmission of useful data nor for control or signaling tasks.

From Kalia, M. et al.: "Data Scheduling and SAR for Bluetooth MAC", VTC 2000 Spring, 2000 IEEE 51ST Vehicular Technology Conference Proceedings, Tokyo, Japan, May 15–18, 2000, IEEE, US, Vol. 2 of 3, Conf. 51, May 15, 2000, p. 716–720, a method for increasing the data throughput in a Bluetooth system is described. The method departs from the cyclic round-robin polling scheme if, for example, both the master terminal unit and the slave terminal unit would like to send data packets to each other in corresponding timeslots. In this case, e.g. more slots are made available for transmission by the master terminal unit.

The slave terminal unit informs the master terminal unit by means of an additional information bit contained in the data packet sent to the master terminal unit whether there are still data in the slave terminal unit for transmission to the master terminal unit, whereupon the addressing schedule is changed. The known method, therefore, needs additional information which is sent to the master terminal unit by the slave terminal unit in order to know the amount of data existing in the slave terminal unit and to be sent to the master terminal unit, and thus an operating condition of the slave terminal unit, and, as a consequence, to change the number of available slots or the polling scheme.

International publication WO 00/31932 discloses a communication system based on a timeslot method. The polling between a master terminal unit and a slave terminal unit of the communication system is performed by way of a flexible polling scheme between existing asynchronous links and no conditions are specified when the polling scheme is changed.

SUMMARY OF THE INVENTION

It is accordingly an object of the invention to provide a method of increasing the data throughput in a communication system which overcomes the above-mentioned disadvantages of the heretofore-known devices and methods of this general type and which renders it possible to achieve a high data throughput in a communication system of the above-mentioned type.

With the foregoing and other objects in view there is provided, in accordance with the invention, a method of communicating in a communication system configured for bidirectional information exchange between a single master terminal unit and a number of slave terminal units on the basis of data packets, particularly in a Bluetooth communication system, wherein:

a communication channel of the communication system has a predetermined timeslot structure with timeslots for transmitting either information from the master terminal unit to one or more of the slave terminal units or for transmitting information from a slave terminal unit to the master terminal unit; and wherein, at least in a first type of link:
  the master terminal unit addresses each slave terminal unit, to which an already existing connection is set up, by repeatedly sending to the slave terminal unit a data packet, addressed to the corresponding slave terminal unit, in accordance with a suitable addressing schedule; and
  the slave terminal unit is enabled to send back a limited number of data packets carrying useful information to the master terminal unit only on having been addressed by the master terminal unit by receiving a data packet.

The novel method comprises the following steps, carried out during an existing link:
monitoring the communication system for an occurrence of a given operating condition associated with a slave terminal unit, the given operating condition with respect to a slave terminal unit occurring when the slave terminal unit has sent out a data packet carrying useful information in response to a last addressing by the master terminal unit and the data packet is detected by the master terminal unit; and
updating the addressing schedule by inserting additional addressing times for the slave terminal unit, on verifying that the given operating condition exists for the slave terminal unit.

In a second embodiment of the invention, the communication system is set up to operate as follows, at least in a first type of link:
  the master terminal unit addresses each slave terminal unit, to which an already existing connection is set up, by repeatedly sending to the slave terminal unit a data packet, addressed to the corresponding slave terminal unit, in accordance with a suitable addressing schedule;
  the slave terminal unit is enabled to send back a limited number of data packets carrying useful information to the master terminal unit only on having been addressed by the master terminal unit by receiving a data packet; and
  the slave terminal unit responds to an error-free receipt of a data packet carrying useful data from the master terminal unit by sending back to the master terminal unit a data packet confirming the error-free receipt of the data packet.

In this variation, the method comprises the following steps, again carried out during an existing link:
monitoring the communication system for an occurrence of a given operating condition associated with a slave terminal unit, the predetermined operating condition with respect to the slave terminal unit occurring if no acknowledgement of the error-free receipt of the useful data is received at the master terminal unit in the data packet sent back from the slave terminal unit in response to a data packet addressed to the slave terminal unit; and
updating the addressing schedule by inserting additional addressing times for the slave terminal unit, on verifying that the given operating condition exists for the slave terminal unit.

In other words, according to the first aspect of the invention, it is the slave terminal units which have responded with a data packet carrying useful information in response to the last addressing which are addressed more frequently (by being sent a data packet) by inserting additional addressing times into the addressing schedule. In these slave terminal units—it can be supposed that still further useful data are available for transmission in the uplink. Due to the additional addressing of the slave terminal unit in question, these are then transmitted more rapidly than if a rigid addressing schedule is used.

If it is agreed in the communication system, according to the second aspect of the invention, that a slave terminal unit responds to the error-free reception of a data packet carrying useful data from the master terminal unit by sending back to the master terminal unit a data packet confirming the error-free reception of the data packet received, an advantageous measure of the method is characterized in that the predetermined operating condition with respect to a slave terminal unit occurs when no acknowledgement of the error-free reception of the useful data is received at the master terminal unit in a data packet sent back by this slave terminal unit in response to a data packet addressed to the slave terminal unit considered and sent out. Although the master terminal unit cannot necessarily assume in this case that the relevant slave terminal unit is keeping ready out a data load to be sent out, a further "premature" addressing of this slave terminal unit appears to be appropriate because the latter has not correctly acknowledged the preceding addressing.

In yet other words, the invention is based on the principle of utilizing capacity, existing in the system but unused, for the purpose of transmitting useful data if a situation (in the form of the occurrence of an operating condition) exists in which the system can assume that useful data, which are to be transmitted as rapidly as possible, are still available at the master terminal unit and/or at one or more of the slave terminal units.

In accordance with an advantageous feature of the novel method, the updated addressing schedule is reset to the addressing schedule used before the occurrence of the operating condition if none of the aforementioned operating conditions are present any longer or are still met. From the point of view of resource distribution, this prevents a slave terminal unit, in the case of which it is no longer necessary to assume that a data load is kept ready for transmission in the uplink or downlink in the relevant slave terminal unit or in the master terminal unit, from being addressed unnecessarily often.

It will be understood that the insertion of addressing times into an existing addressing schedule according to the invention does not presuppose that this existing addressing schedule necessarily uses a constant identical repetition period for addressing each slave terminal unit. Using the invention, the data throughput can also be improved in a communication system with an addressing schedule that is already designed to be flexible to a certain extent. However, a particularly great effect is achieved by the invention when additional addressing times are inserted into a rigid addressing schedule (i.e. one which is designed with a constant repetition period which is identical for all slave terminal units).

As already mentioned, the invention is based on a first type of connection in which a slave terminal unit can respond to being addressed by the master terminal unit by sending back only a limited data volume. This prerequisite is met in the case of an ACL connection in the Bluetooth communication system. In contrast, in the case of an SCO connection which can exist in competition with an ACL connection in such a system, data packets can be transmitted in reserved timeslots from the slave terminal unit to the master terminal unit even without being called up by the master terminal unit. Since the synchronous connection-oriented SCO connections have priority over the ACL connections, SCO connections, for which fixed timeslots are reserved in advance as already mentioned, must not be disturbed or interrupted by the method according to the invention. In this case, an advantageous measure of the method is characterized in that additional addressing times are inserted exclusively into timeslots not reserved for an SCO connection. Another possibility consists in reinserting additional addressing times only when a transmission of data packets from a slave terminal unit to the master terminal unit in the second type of connection (SCO connection) has ended.

Other features which are considered as characteristic for the invention are set forth in the appended claims.

Although the invention is illustrated and described herein as embodied in a method for increasing the data throughput in a communication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a diagrammatic representation of the structure of a data packet;

FIG. 5 is a diagrammatic representation of a data packet header;

FIG. 6 is a timing chart explaining the control of the communication channel in the case of a data exchange between a master terminal unit and two slave terminal units;

FIG. 7 is a frame timing sequence showing an addressing schedule according to the prior art; and FIG. 8 is a frame timing sequence showing an addressing schedule according to the invention.

DESCRIPTION OF THE PREFERRED EMBODIMENTS

Figure 1:
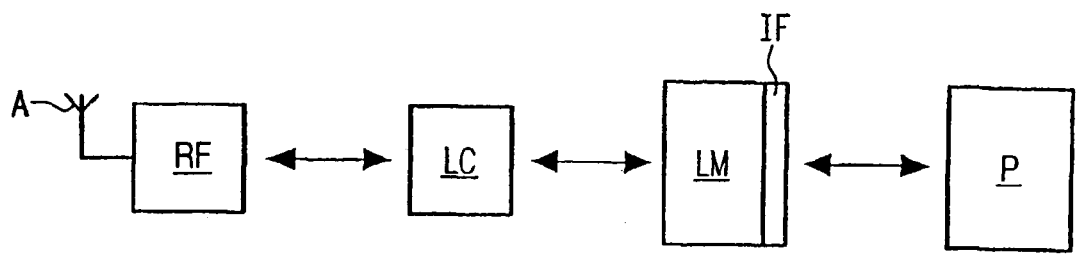
FIG. 1 is a block diagramm of the function blocks in a terminal unit of a communication system.

Referring now to the figures of the drawing in detail and first, particularly, to FIG. 1 thereof, there is shown the basic structure of a master and slave terminal unit of a communication system according to the invention. The subsequent description of the communication system is based on the Bluetooth standard which is provided for wireless data transmission over short distances. However, the invention is not restricted to a communication system based on the Bluetooth standard but generally provides for an improvement of the data throughput in comparable TDD systems.

A master and slave terminal unit comprises a computer or processor P, a link manager LM with computer/control interface IF, a link controller LC and a radio-frequency stage RF with an antenna A. Data to be output and sent out by the computer or processor P must be assembled by the link manager LM to form suitable data packets. Furthermore, the link manager LM handles the tasks of network configuration and of setting up connections.

The link controller LC decides when a data packet is sent out. The data packet is suitably supplemented (the useful data are preceded by a suitable access code and a packet header) and the completed data packet is forwarded to the radio-frequency stage RF for modulating onto a carrier. The link manager LM and the link controller LC thus form the protocol layers of the communications standard that is under consideration here (e.g. Bluetooth standard).

Figure 2:
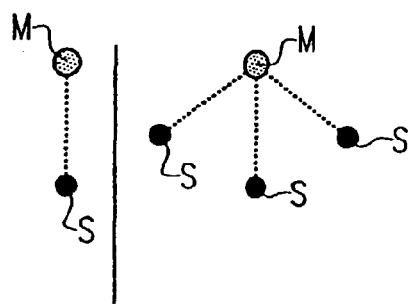
FIG. 2 is a schematic diagram illustrating possible system or network configurations.

FIG. 2 illustrates the configuration of a Bluetooth network (piconet). The piconet can comprise two to eight active terminal units. Each network comprises exactly one master terminal unit; the remaining terminal units are implemented by slave terminal units. The slave terminal units can only communicate with the master terminal unit but not with one another. A minimal piconet is formed by one master terminal unit M and one slave terminal unit S, as illustrated in the left-hand portion of FIG. 2. The right-hand portion of FIG. 2 shows a piconet consisting of three slave terminal units S and one master terminal unit M. The decision as to whether a terminal unit acts as master or as slave terminal unit in the network is made at protocol level by the link manager LM, i.e., it is not a hardware property of the terminal units considered.

Figure 3:
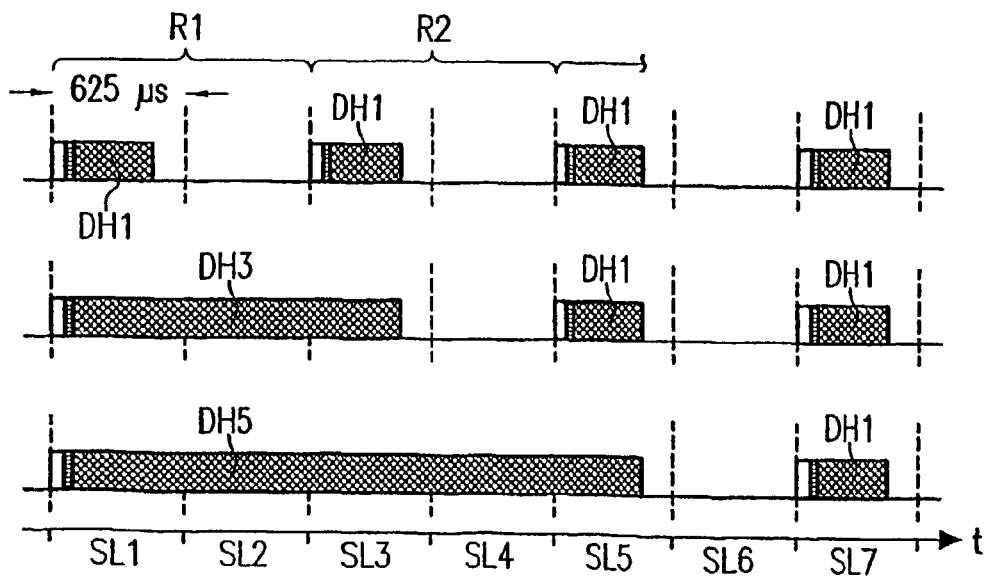
FIG. 3 is a timing chart illustrating the timeslot structure in conjunction with the transmission of data packets via the communication channel.

The communication channel of the Bluetooth system is structured into timeslots with a length of 625 µs. In FIG. 3, seven time-slots SL1, SL2 ..., SL7 are plotted along the time axis t. Two successive timeslots SL1, SL2 or SL3, SL4 etc. are combined to form one frame R1, R2, ... having a length of 1250 μs. In consequence, 800 frames correspond to the period of one second.

According to the Bluetooth standard, two different types of data link, namely ACL links (Asynchronous Connection-Less) and SCO (Synchronous Connection-Oriented) links, can be implemented, as mentioned above.

In the asynchronous ACL data link, there are six different Bluetooth data packets. A distinction is made between DM (Data Medium rate) packets and DH (Data High rate) packets. DM packets are protected by channel coding whereas DH packets are transmitted without channel coding. The decision as to whether channel coding is to be carried out or not (i.e. the decision about which type of packet is to be used) is made at protocol level and depends on the current channel conditions. Both the DM data packets and the DH data packets can be present in three different lengths. DM1 and DH1 data packets in each case occupy one timeslot, DM3 and DH3 data packets occupy three timeslots and DM5 and DH5 data packets in each case occupy five timeslots. In FIG. 3, DH1, DH3 and DH5 data packets are shown in an exemplary manner above the timeslot structure of the transmission channel.

In the synchronous SCO data links in which voice data are transmitted, three different data packets are defined which are designated as HV1, HV2 and HV3. Each of these data packets is transmitted within a timeslot SL1, SL2, .... The data packets HV1, HV2, HV3 differ in the information contained in them. The gross amount of useful data is identical for all packets and is 240 bits. Due to different channel codings, however, the data packets differ in their net amount of data. The net amount of data is 80 bits in the HV1 packet, 160 bits in the HV2 packet and 240 bits in the HV3 packet. To be able to transmit the required data rate of 64 kbit/s bidirectionally, the SCO link must have assigned to it each frame when HV1 packets are used, every other frame when HV2 packets are used and every third frame when HV3 packets are used.

FIG. 4 shows the general format of all data packets. The first 72 bits of the data packet are occupied by an access code AC. The access code AC is followed by a packet header H with a length of 54 bits. The remaining part of the data packet is implemented by the (possibly channel-coded) useful data ND. The length of the useful data is 0 to 2745 bits.

The access code AC is used, among other things, for synchronization purposes. The structure of the packet header H is shown in greater detail in FIG. 5. Only the data fields AM_ADDR, TYPE and ARQN are of significance for the invention. AM_ADDR represents the address of a slave terminal unit S active in the piconet. To be able to separately identify each slave terminal unit, each slave terminal unit has assigned to it a temporary 3-bit address which is valid as long as this terminal unit is active, i.e. a fixed (ACL or SCO) link exists to the master terminal unit M. Data packets which are exchanged between the master terminal unit M and the slave terminal unit S all carry this address AM_ADDR of the slave terminal unit, i.e. the address AM_ADDR of the slave terminal unit is used in both directions of data transfer.

The 4-bit data word TYPE specifies the type of packet. In particular, TYPE shows whether this is a data packet for an ACL link or a data packet for an SCO link. The associated data packets carrying useful data have already been mentioned. Furthermore, however, there are also data packets that are used in both types of connection. The data packet POLL is of particular significance in this respect. The data packet POLL does not carry any useful data. It is used by the master terminal unit M in both types of connection for selectively addressing slave terminal units and thus for enabling these to send back data to the master terminal unit M.

ARQN is a 1-bit acknowledgement information item by means of which a slave terminal unit S reports to the master terminal unit M whether useful data of a data packet previously received have been correctly received.

The further data fields FLOW, SEQN (one bit each) and HEC (eight bits) are used for control and error checking purposes; they do not need to be explained in greater detail for the purposes of the invention.

A terminal unit can be either in the TX state (terminal unit transmitting) or in the RX state (terminal unit receiving). In the case of SCO links (the data packets of which in each case occupy only one timeslot), frames are occupied by a TX/RX pair, i.e. the master terminal unit M is switched in the transmit direction (TX) for the duration of a timeslot in the first half of the frame R and is in the receive direction (RX) in the second half of the frame. By comparison, a slave terminal unit S is always first switched in the RX direction and then in the TX direction. The slave terminal unit S responds as it were after having received a data packet.

In principle, it holds true for ACL links that a slave terminal unit S may switch to transmit operation (TX) only when it has received a data packet in the immediately preceding timeslot. In addition, however, it must be taken into consideration that there are data packets which occupy a number of timeslots. If, for example, the master terminal unit M sends a DM5 data packet which extends over five timeslots, the master terminal unit M is switched in the TX direction for five timeslots and the slave terminal unit S is switched in the RX direction for five timeslots. In the subsequent timeslot, the slave terminal unit S will respond to the master terminal unit M. The response data packet then sent out can extend again over one, three or five timeslots. In this period, the master terminal unit M is switched in the RX direction and the slave terminal unit S is switched in the TX direction.

FIG. 6 illustrates the time sequence of transmit and receive processes in the communication channel for the example of a piconet comprising one master terminal unit M and two slave terminal units S1 and S2. Only data packets occupying only one timeslot are considered. In the first timeslot SL1, the master terminal unit transmits to the first slave terminal unit S1. The first slave terminal unit S1 replies in the second timeslot SL2. In the third timeslot SL3, the master terminal unit M sends a data packet to the second slave terminal unit S2. The latter sends back a response data packet to the master terminal unit M in the timeslot SL4. The sequence shown in timeslots SL3 and SL4 is repeated in timeslots SL5 and SL6. The transmit/receive sequence in timeslots SL7 and SL8 corresponds to the sequence in the first two timeslots SL1 and SL2 already explained.

In the text which follows, the case is considered where only asynchronous ACL communication links exist in the communication system. Since a slave terminal unit S may not send any data packets on its own initiative and can only send back a limited amount of useful data (namely one response data packet) even when it receives a data packet, it is necessary for the master terminal unit M to regularly address every slave terminal unit S in order to guarantee a minimum data transfer rate. For this purpose, a maximum poll interval is predetermined for each active ACL link by higher Bluetooth protocol layers. The maximum poll interval describes the time which may elapse at a maximum between successive polling of a slave terminal unit S, S1, S2. In the prior art, cyclic polling of all active slave terminal units S is typically implemented by using the maximum polling interval as the repetition period. Polling (addressing) is either done by a data packet carrying useful data and happening to be available or, if such a data packet is lacking, by means of a poll data packet.

The Bluetooth standard provides that the master terminal unit M then uses any remaining transmission capacity for setting up further links to other master terminal units S, S1, S2 or to serve (inactive) slave terminal units, which are in an energy-saving mode (hold mode, parked mode or sniffing mode). However, the piconet can also be configured in such a manner that no connection set-up is desired and/or the serving of inactive slave terminal units uses little capacity. In this case, the invention provides for using unoccupied capacities by selectively additionally addressing active slave terminal units S and increasing the data throughput by this means, or improving the temporal load balance in the communication channel.

In consequence, it can be provided to poll more frequently those slave terminal units which have actually sent a data packet after the last polling. Another possibility of "unscheduled" polling with a data load present at the master terminal unit consists in sending a data packet as quickly as possible to the corresponding slave terminal unit S, S1, S2 instead of waiting until the slave terminal unit has to be served in accordance with the polling interval set. It also appears to be reasonable to consider a premature polling of a slave terminal unit S, S1, S2 if it has to be assumed that the data packet last sent by the master terminal unit M has not been received due to a lack of acknowledgment (which can be seen from the state of the ARQN bit).

A simple possibility for supplementing the addressing schedule in these cases consists in providing, at the level of the link controller LC, an additional data structure or table in which each slave terminal unit S, S1, S2 is identified if at least one of the following conditions applies:

the receipt of a data packet last sent by the master terminal unit M and carrying useful data has not yet been acknowledged by the slave terminal unit addressed;

the receipt of the data packet last sent by the master terminal unit M and carrying useful data has been acknowledged by the slave terminal unit but there are already new data which must be transmitted to this slave terminal unit S;

at the master terminal unit M, a data packet carrying useful data has been received from the slave terminal unit S.

If none of these conditions is met (anymore), any identification of the slave terminal unit which may exist is cancelled.

The information characteristic of slave terminal units, obtained in this manner, is taken into consideration in the transmitting activity of the master terminal unit M in the following manner. As already mentioned, data provided by the link manager LM is sent by the link controller LC only when it is the turn of the respective slave terminal unit according to the addressing schedule. If there is an identified slave terminal unit S, the link manager LM assembles a corresponding data packet (POLL data packet or possibly a data packet carrying useful information) and informs the link controller LC of the identification of this slave terminal unit S. The link controller LC then enters an additional addressing time into its addressing schedule with respect to this slave terminal unit S and sends the data packet into the transmission channel at this time. This process is repeated until the identification of the slave terminal unit S considered is cancelled.

FIG. 7 shows an example of an addressing schedule according to the prior art. The example is based on a piconet consisting of a master terminal unit A (e.g., a printer) and four slave terminal units B, C, D and E (e.g. PCs). The master terminal unit A is configured in such a way that each slave terminal unit B, C, D, E is polled at least in every twentieth frame (maximum polling interval). The frame number in FIG. 7 is obtained from the sum of the column number and of the number of rows carried forward. In the example shown, it was set via the LM protocol that only short ACL data packets (DM1 and DH1) can be used. Furthermore, SCO data links, low-energy modes and any connection set-up to other slave terminal units are deactivated.

In the usual method, all slave terminal units B, C, D, E are continuously addressed in every twentieth frame. In the first frames 0, 1, 2, 3, the slave terminal units B, C, D, E do not respond with a data packet carrying useful data. In frame 21, the slave terminal unit C responds with a data packet carrying useful data since, for example, a print order is to be delivered. The return transmission of a data packet carrying useful data is identified by an exclamation mark "!" in FIG. 7. This slave terminal unit will continuously respond with a data packet carrying useful data to each polling by the master terminal unit A until the print order has been transmitted. This meets the minimum data transfer rate requirement.

Assuming that the slave terminal unit C wishes to transmit a file with a size of 1 Mbyte and assuming that only DH1 packets with a 27 byte payload are used and no retransmissions occur, the transmission lasts for 1 Mbyte/27 bytes*20/800 seconds=925 seconds.

Using the addressing schedule shown in FIG. 8, an application of the method according to the invention is explained. The polling interval is also 20 frames. After the receipt of the response data packet sent out by the slave terminal unit C in the 21st frame, the slave terminal unit C is identified. The identification of the slave terminal unit C has the effect that the master terminal unit A polls the slave terminal unit C during those frames in which there is otherwise no data transmission (see FIG. 7). In consequence, all frames hitherto not used are used for the transmission of useful data from the slave terminal unit C to the master terminal unit A—again marked by an "!"—in the example shown.

In this example, the transmission rate thus increases by a factor of 17. The transmission of a file with a size of 1 Mbyte thus takes 1 Mbyte/27 bytes*(20/17)/800 seconds=54 seconds.

It is pointed out that the maximum increase in the data transmission rate, explained in FIG. 8, can only be implemented if no SCO link to other slave terminal units, which may be present, are to be established within the transmission period considered. SCO links have priority over ACL links. If, for example, an SCO link is to be added to another slave terminal unit on the basis of the transmission of HV3 data packets, every third frame must be allocated to this slave terminal unit (that is to say, an HV3-SCO link needs one third of the entire transmission capacity available). In this case too, however, the remaining frames would still be available for the data link between the slave terminal unit C and the master terminal unit A, utilization of the remaining unoccupied transmission resources being effected in the manner already described by "filling up" the still unoccupied frames of the addressing schedule with POLL data packets addressed to the slave terminal unit C.

We claim:

1. A method of communicating in a communication system configured for bidirectional information exchange between a single master terminal unit and a number of slave terminal units on the basis of data packets, wherein:
a communication channel of the communication system has a predetermined timeslot structure with timeslots for transmitting either information from the master terminal unit to one or more of the slave terminal units or for transmitting information from a slave terminal unit to the master terminal unit; and
wherein, at least in a first type of link:
the master terminal unit addresses each slave terminal unit, to which an already existing connection is set up, by repeatedly sending to the slave terminal unit a data packet, addressed to the corresponding slave terminal unit, in accordance with a suitable addressing schedule; and
the slave terminal unit is enabled to send back a limited number of data packets carrying useful information to the master terminal unit only on having been addressed by the master terminal unit by receiving a data packet;
the method which comprises the following steps, carried out during an existing link:
monitoring the communication system for an occurrence of a given operating condition associated with a slave terminal unit, the given operating condition with respect to a slave terminal unit occurring when the slave terminal unit has sent out a data packet carrying useful information in response to a last addressing by the master terminal unit and the data packet is detected by the master terminal unit; and
updating the addressing schedule by inserting additional addressing times for the slave terminal unit, on verifying that the given operating condition exists for the slave terminal unit.

2. The method according to claim 1, which comprises implementing the method steps within a Bluetooth communication system.

3. The method according to claim 1, which comprises resetting the addressing schedule to the addressing schedule used before the occurrence of the operating condition allocated to a given slave terminal unit if the given operating condition is no longer met.

4. The method according to claim 1, wherein a slave terminal unit addressed by the master terminal unit is enabled to send back only a single data packet carrying useful information to the master terminal unit.

5. The method according to claim 1, which comprises transmitting solely data packets each occupying a single timeslot.

6. The method according to claim 1, wherein the timeslots for transmission of information from the master terminal unit to one or more of the slave terminal units, and the timeslots for transmission of information from a slave terminal unit to the master terminal unit are arranged to alternate with one another.

7. The method according to claim 1, wherein the addressing schedule for each slave terminal unit, prior to any updating, has a constant retransmission period.

8. The method according to claim 7, wherein the addressing schedule, prior to any updating, has an identical retransmission period for all slave terminal units.

9. The method according to claim 1, wherein the communication system is configured to operate with a second type of link for which certain timeslots are reserved and in which a slave terminal unit, following the receipt of a data packet from the master terminal unit, is enabled to send back data packets to the master terminal unit until another slave terminal unit is addressed by the master terminal unit, and the method further comprises:
operating the first type of link and the second type of link in competition with one another on the communication channel; and
when a condition occurs with respect to the other slave terminal unit, updating the addressing schedule by inserting additional addressing times into timeslots that are not reserved.

10. The method according to claim 1, wherein the communication system is configured to operate with a second type of link for which certain timeslots are reserved and in which a slave terminal unit, following the receipt of a data packet from the master terminal unit, is enabled to send back data packets to the master terminal unit until another slave terminal unit is addressed by the master terminal unit, and the method further comprises:
operating the first type of link and the second type of link in competition with one another on the communication channel; and
when a condition occurs with respect to the other slave terminal unit, updating the addressing schedule by reinserting additional addressing times only when a transmission of data packets from the slave terminal unit to the master terminal unit in the second type of link has ended.

11. A method of communicating in a communication system configured for bidirectional information exchange between a single master terminal unit and a number of slave terminal units on the basis of data packets, wherein:
a communication channel of the communication system has a predetermined timeslot structure with timeslots for transmitting either information from the master terminal unit to one or more of the slave terminal units or for transmitting information from a slave terminal unit to the master terminal unit; and
wherein, at least in a first type of link:
the master terminal unit addresses each slave terminal unit, to which an already existing connection is set up, by repeatedly sending to the slave terminal unit a data packet, addressed to the corresponding slave terminal unit, in accordance with a suitable addressing schedule;
the slave terminal unit is enabled to send back a limited number of data packets carrying useful information to the master terminal unit only on having been addressed by the master terminal unit by receiving a data packet; and
the slave terminal unit responds to an error-free receipt of a data packet carrying useful data from the master terminal unit by sending back to the master terminal unit a data packet confirming the error-free receipt of the data packet;
the method which comprises the following steps, carried out during an existing link:
monitoring the communication system for an occurrence of a given operating condition associated with a slave terminal unit, the predetermined operating condition with respect to the slave terminal unit occurring if no acknowledgement of the error-free receipt of the useful data is received at the master terminal unit in the data packet sent back from the slave terminal unit in response to a data packet addressed to the slave terminal unit; and updating the addressing schedule by inserting additional addressing times for the slave terminal unit, on verifying that the given operating condition exists for the slave terminal unit.

12. The method according to claim 11, which comprises implementing the method steps within a Bluetooth communication system.

13. The method according to claim 11, which comprises resetting the addressing schedule to the addressing schedule used before the occurrence of the operating condition allocated to a given slave terminal unit if the given operating condition is no longer met.

14. The method according to claim 13, wherein, upon resetting, a slave terminal unit addressed by the master terminal unit is enabled to send back only a single data packet carrying useful information to the master terminal unit.

15. The method according to claim 11, which comprises transmitting solely data packets each occupying a single timeslot.

16. The method according to claim 11, wherein the timeslots for transmission of information from the master terminal unit to one or more of the slave terminal units, and the timeslots for transmission of information from a slave terminal unit to the master terminal unit are arranged to alternate with one another.

17. The method according to claim 11, wherein the addressing schedule for each slave terminal unit, prior to any updating, has a constant retransmission period.

18. The method according to claim 17, wherein the addressing schedule, prior to any updating, has an identical retransmission period for all slave terminal units.

19. The method according to claim 11, wherein the communication system is configured to operate with a second type of link for which certain timeslots are reserved and in which a slave terminal unit, following the receipt of a data packet from the master terminal unit, is enabled to send back data packets to the master terminal unit until another slave terminal unit is addressed by the master terminal unit, and the method further comprises:

operating the first type of link and the second type of link in competition with one another on the communication channel; and when a condition occurs with respect to the other slave terminal unit, updating the addressing schedule by inserting additional addressing times into timeslots that are not reserved.

20. The method according to claim 11, wherein the communication system is configured to operate with a second type of link for which certain timeslots are reserved and in which a slave terminal unit, following the receipt of a data packet from the master terminal unit, is enabled to send back data packets to the master terminal unit until another slave terminal unit is addressed by the master terminal unit, and the method further comprises:

operating the first type of link and the second type of link in competition with one another on the communication channel; and when a condition occurs with respect to the other slave terminal unit, updating the addressing schedule by reinserting additional addressing times only when a transmission of data packets from the slave terminal unit to the master terminal unit in the second type of link has ended.

* * * * *